United States Patent
Matsumoto (10) Patent No.: US 11,362,888 B2
(45) Date of Patent: Jun. 14, 2022

(54) COMMUNICATION APPARATUS, COMMUNICATION SYSTEM, AND COMMUNICATION METHOD

(71) Applicant: TOYOTA JIDOSHA KABUSHIKI KAISHA, Toyota (JP)

(72) Inventor: Kazuki Matsumoto, Ogaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/097,503

(22) Filed: Nov. 13, 2020

(65) Prior Publication Data

US 2021/0258206 A1 Aug. 19, 2021

(30) Foreign Application Priority Data

Feb. 18, 2020 (JP) .............................. JP2020-025494

(51) Int. Cl.

| G06F 15/177 | (2006.01) |
|---|---|
| H04L 41/08 | (2022.01) |
| H04W 4/40 | (2018.01) |
| H04L 43/0805 | (2022.01) |
| H04W 48/18 | (2009.01) |
| H04W 24/10 | (2009.01) |
| H04W 48/16 | (2009.01) |
| H04W 4/02 | (2018.01) |
| H04L 43/08 | (2022.01) |
| H04W 24/02 | (2009.01) |

(52) U.S. Cl.
CPC .............. *H04L 41/08* (2013.01); *H04L 43/08* (2013.01); *H04L 43/0805* (2013.01); *H04W 4/02* (2013.01); *H04W 4/40* (2018.02); *H04W 24/02* (2013.01); *H04W 24/10* (2013.01); *H04W 48/16* (2013.01); *H04W 48/18* (2013.01)

(58) Field of Classification Search
CPC .................................. H04L 41/08; H04W 4/40
See application file for complete search history.

(56) References Cited

U.S. PATENT DOCUMENTS 7,287,180 B1 * 10/2007 Chen ........................ H04L 41/08
714/11
10,812,563 B1 * 10/2020 Veloso ..................... H04W 4/40
(Continued)

FOREIGN PATENT DOCUMENTS

JP 2014-123843 A 7/2014

OTHER PUBLICATIONS

U.S. Appl. No. 16/731,142, filed Dec. 31, 2019 in the name of Kazuki Matsumoto.

*Primary Examiner* — Richard G Keehn
(74) *Attorney, Agent, or Firm* — Oliff PLC (57) ABSTRACT

A communication apparatus that can communicate with a public communication network by using an in-vehicle communication module permanently installed in a vehicle or one or more external communication modules not installed permanently in the vehicle. The communication apparatus includes: a memory unit configured to store a selection table recording a criterion for selecting a communication module to be used for the communication; and a control unit configured to evaluate a plurality of the communication modules and acquire an evaluation result; and to select a communication module to be used for communication according to the evaluation result and the selection table.

15 Claims, 10 Drawing Sheets

(56) References Cited

U.S. PATENT DOCUMENTS

| | | | | |
|---|---|---|---|---|
| 2007/0094410 A1* | 4/2007 | Voigt | ............... | H04L 41/08 |
| | | | | 709/237 |
| 2019/0394089 A1* | 12/2019 | Barrett | ............... | H04W 4/40 |
| 2020/0267637 A1* | 8/2020 | Veloso | ............... | H04W 4/40 |
| 2021/0241212 A1* | 8/2021 | Horvat | ............... | G06K 7/10366 |

* cited by examiner

SELECTION TABLE ASSOCIATED WITH REGION 1

| COMMUNICATION AVAILABILITY | | | COMMUNICATION SPEED | COMMUNICATION COST | HIGHEST PRIORITY | SECOND HIGHEST PRIORITY | THIRD HIGHEST PRIORITY | NOTE |
|---|---|---|---|---|---|---|---|---|
| A | B | C | | | | | | |
| AVAILABLE | AVAILABLE | AVAILABLE | A | — | A | — | — | |
| AVAILABLE | AVAILABLE | AVAILABLE | A | A | A | — | — | |
| AVAILABLE | AVAILABLE | AVAILABLE | A | B | B | A | — | |
| AVAILABLE | AVAILABLE | AVAILABLE | A | C | C | A | — | |
| AVAILABLE | AVAILABLE | AVAILABLE | A | B/C | B/C | B/C | A | PREFERENTIALLY USE LAST-CONNECTED ONE |
| AVAILABLE | AVAILABLE | AVAILABLE | B | — | B | A | — | |
| AVAILABLE | AVAILABLE | AVAILABLE | B | A | A | — | — | |
| AVAILABLE | AVAILABLE | AVAILABLE | B | B | B | A | — | |
| ... | ... | ... | ... | ... | ... | ... | ... | ... |

Fig. 4A

SELECTION TABLE ASSOCIATED WITH REGION 2

| COMMUNICATION AVAILABILITY | | | COMMUNICATION SPEED | COMMUNICATION COST | HIGHEST PRIORITY | SECOND HIGHEST PRIORITY | THIRD HIGHEST PRIORITY | NOTE |
| A | B | C | | | | | | |
| --- | --- | --- | --- | --- | --- | --- | --- | --- |
| ... | ... | ... | ... | ... | ... | ... | ... | ... |
| NON-AVAILABLE | AVAILABLE | NON-AVAILABLE | B | C | A | – | – | |
| NON-AVAILABLE | AVAILABLE | NON-AVAILABLE | B | B/C | A | – | – | |
| NON-AVAILABLE | NON-AVAILABLE | AVAILABLE | C | – | C | A | – | |
| NON-AVAILABLE | NON-AVAILABLE | AVAILABLE | C | A | C | A | – | |
| NON-AVAILABLE | NON-AVAILABLE | AVAILABLE | C | B | C | A | – | |
| NON-AVAILABLE | NON-AVAILABLE | AVAILABLE | C | C | C | A | – | |
| NON-AVAILABLE | NON-AVAILABLE | AVAILABLE | C | B/C | C | A | – | |
| NON-AVAILABLE | NON-AVAILABLE | NON-AVAILABLE | – | – | A | – | – | |
| NON-AVAILABLE | NON-AVAILABLE | NON-AVAILABLE | – | A | A | – | – | |
| NON-AVAILABLE | NON-AVAILABLE | NON-AVAILABLE | – | B | A | – | – | |
| NON-AVAILABLE | NON-AVAILABLE | NON-AVAILABLE | – | C | A | – | – | |
| NON-AVAILABLE | NON-AVAILABLE | NON-AVAILABLE | – | B/C | A | – | – | |
| ... | ... | ... | ... | ... | ... | ... | ... | ... |

Fig. 4B

MASTER TABLE

| TABLE ASSOCIATED WITH REGION 1 |
| TABLE ASSOCIATED WITH REGION 2 |
| TABLE ASSOCIATED WITH REGION 3 |
| TABLE ASSOCIATED WITH REGION 4 |
| . . . |

COMMUNICATION APPARATUS, COMMUNICATION SYSTEM, AND COMMUNICATION METHOD

CROSS REFERENCE TO RELATED APPLICATION

This application claims the benefit of Japanese Patent Application No. 2020-025494, filed on Feb. 18, 2020, which is hereby incorporated by reference herein in its entirety.

BACKGROUND

Technical Field

The present disclosure relates to mobile communication.

Description of the Related Art

In recent years, the number of automobiles that can communicate with a public communication network through a communication module (data communication module (DCM)) has been increasing. In relation with this, Patent document 1 discloses a system for communication using either an in-vehicle communication module or an external communication apparatus loaded into the vehicle. With such a system, a plurality of communication modules can be selectively used according to conditions such as communication cost and communication speed.

CITATION LIST

Patent Document

[Patent document 1] Japanese Patent Laid-Open No. 2014-123843

SUMMARY

For existing in-vehicle communication systems, there is room for improvement in communication stability which is achieved by dynamically selecting a more appropriate communication module.

An object of the present disclosure, which has been made in consideration of the aforementioned problem, is to enhance communication stability in a communication system in which a plurality of communication modules can be used.

A communication apparatus according to a first aspect of the present disclosure is a communication apparatus that can communicate with a public communication network by using either an in-vehicle communication module permanently installed in a vehicle or one or more external communication modules not installed permanently in the vehicle, the communication apparatus including: a memory unit configured to store a selection table recording a criterion for selecting a communication module to be used for the communication; and a control unit configured to evaluate a plurality of the communication modules and acquire an evaluation result; and to select a communication module to be used for communication according to the evaluation result and the selection table.

A communication system according to a second aspect of the present disclosure includes: a communication apparatus that can communicate with a public communication network by using either an in-vehicle communication module permanently installed in a vehicle or one or more external communication modules not installed permanently in the vehicle; and a server apparatus that provides the communication apparatus with information, wherein the server apparatus includes: a first memory unit configured to store a selection table recording a criterion for selecting a communication module to be used by the communication apparatus for communication; and a first control unit configured to distribute the selection table to the communication apparatus, and the communication apparatus includes: a second memory unit configured to store the selection table received from the server apparatus; and a second control unit configured to evaluate a plurality of the communication modules and acquire an evaluation result; and to select a communication module to be used for communication according to the evaluation result and the selection table.

A communication method according to a third aspect of the present disclosure is a communication method performed by a communication apparatus that can communicate with a public communication network by using either an in-vehicle communication module permanently installed in a vehicle or one or more external communication modules not installed permanently in the vehicle, the communication method including the steps of: acquiring a selection table recording a criterion for selecting a communication module to be used for the communication; evaluating a plurality of the communication modules and acquiring an evaluation result; and selecting a communication module to be used for communication according to the evaluation result and the selection table.

Other aspects include a program for a computer to perform the aforementioned information processing method, and a non-transitory computer-readable memory medium storing the program.

According to the present disclosure, communication stability can be enhanced in a communication system in which a plurality of communication modules can be used.

DESCRIPTION OF THE EMBODIMENTS

A communication system according to this embodiment is an in-vehicle communication system in which a computing device in the vehicle communicates with external units via a mobile communication network.

The communication apparatus according to this embodiment is a communication apparatus that can communicate with a public communication network by using either an in-vehicle communication module that is permanently installed in a vehicle or one or more external communication modules that are communication modules not permanently installed in the vehicle.

These communication modules may communicate via different communication operators, or in accordance with different communication standards as long as they communicate using different communication channels.

For an in-vehicle communication system that can select a plurality of communication modules, the preferable communication module may change depending on the situation. For example, the radio signal electric field strength and the communication speed constantly change depending on the positional relationship between the base station and the vehicle, the existence of road structures, and the like. For this reason, for more stable wireless communication, it is preferable that the communication apparatus dynamically switch the communication module to be used, depending on the current situation.

A standard for selection among a plurality of communication modules (a standard that indicates which communication module is to be used under which circumstances; hereinafter referred to as selection standard) can be predetermined. Continuous use of the same selection criteria may however cause inconvenience.

For instance, even if the same communication module uses the same communication standard for communication, if the communication operator changes depending on the country or region, the communication speed or communication cost changes. In addition, a specific communication standard may not be available in some countries or regions. In certain countries or regions, a communication standard that is no longer used in the other countries or regions may be in service.

In other words, when a vehicle moves between countries or regions under different communication conditions, if the communication module is selected using the same selection criterion, an inconvenience may occur such as communication may be interrupted, the expected communication speed cannot be obtained, or unexpected communication cost may occur.

To address this problem, the communication apparatus according to this embodiment uses a selection table recording the criteria for selecting a communication module to be used for communication.

To be specific, the communication apparatus is characterized by including a memory unit configured to store a selection table and a control unit configured to evaluate a plurality of the communication modules, acquire an evaluation result, and select, based on the evaluation result and the selection table, a communication module to be used for communication.

The communication apparatus in this embodiment can selectively use a plurality of communication modules for communication. The plurality of communication modules include in-vehicle communication modules permanently installed in vehicles and other communication modules. An in-vehicle communication module is a communication module such as a data communication module (DCM) provided to a vehicle. A communication module not permanently installed in a vehicle is an external communication module loaded into the vehicle by a user, such as a communication module built in a mobile router.

The communication apparatus according to this embodiment determines which of a plurality of communication modules is to be used for communication with reference to an evaluation result for the communication module and a selection table.

This configuration makes it possible to rewrite the selection table according to the situation (for example, the country or region where the vehicle is currently traveling). In other words, it makes it possible to select a more appropriate communication module, thereby enhancing communication stability.

Note that the control unit may be characterized in that it evaluates a plurality of the communication modules as described above using a plurality of criteria.

The plurality of criteria can be, for example, at least one of communication cost, communication speed, and availability of communication.

Moreover, the selection table may be characterized by associating the result of the evaluation for each communication module with the selection priority of the communication module.

Such a configuration makes it possible to comprehensively evaluate the selection suitability of communication modules.

Moreover, the control unit may be characterized by receiving the selection table from a server apparatus that controls communication and updating it.

Distributing the selection table to the communication apparatus, the server apparatus can update the selection criteria for the communication modules in real time.

Moreover, the control unit may be characterized by receiving the selection table associated with the current location of the communication apparatus from the server apparatus.

With this configuration, the communication module selection criteria can be changed based on the geographical location of the vehicle. This makes it possible, for example, to provide different selection criteria depending on the country or region where the vehicle is located.

Moreover, when the communication apparatus moves between regions, the control unit may be characterized by receiving the selection table associated with the destination region from the server apparatus.

The plurality of regions may have the same shape and size like a mesh or may be designed to have an arbitrary size or shape. It may be designed for each country or region. With the received selection table associated with the region, the communication module suitable for the communication circumstance of the country or region can be selected.

An embodiment of the present disclosure will now be described with reference to the accompanying drawings. The configurations in the embodiments below are merely illustrative, and the present disclosure is not limited to the configurations in the embodiments.

First Embodiment

The outline of the communication system according to the first embodiment will be described with reference to FIG. 1. The communication system according to this embodiment includes a communication apparatus 100 mounted on a vehicle and a server apparatus 200.

In the communication system according to this embodiment, the communication apparatus 100 transmits information about the apparatus (for example, positional information) to the server apparatus 200, and responding to it, the server apparatus 200 generates and transmits a selection table to be used by the communication apparatus 100. The selection table is a table recording criteria for selecting communication modules used for communication of the communication apparatus 100. The communication apparatus 100 selects a communication module according to the selection table acquired from the server apparatus 200 and communicates via a wide area network (for example, the Internet).

The server apparatus 200 generates a selection table based on the location of a vehicle equipped with the communication apparatus 100, for example. Hence, for example, a selection table associated with an area A can be transmitted to a vehicle running in the area A, and a selection table associated with an area B can be transmitted to a vehicle running in the area B.

For instance, when a 3G communication service is mainly provided in the area A, a selection table indicating the criterion that "communication modules using 3G are preferentially used" can be transmitted to a vehicle running in the area A. When a communication service using 5G and 4G is provided in the area B, a selection table indicating the criterion that "communication modules using 5G are selected on the highest priority, and communication modules using 4G are selected on the second highest priority" can be transmitted to a vehicle running in the area B.

In other words, an appropriate communication module can be selected according to the communication circumstance of each country or area.

The components of the system will now be described in detail.

Figure 1:
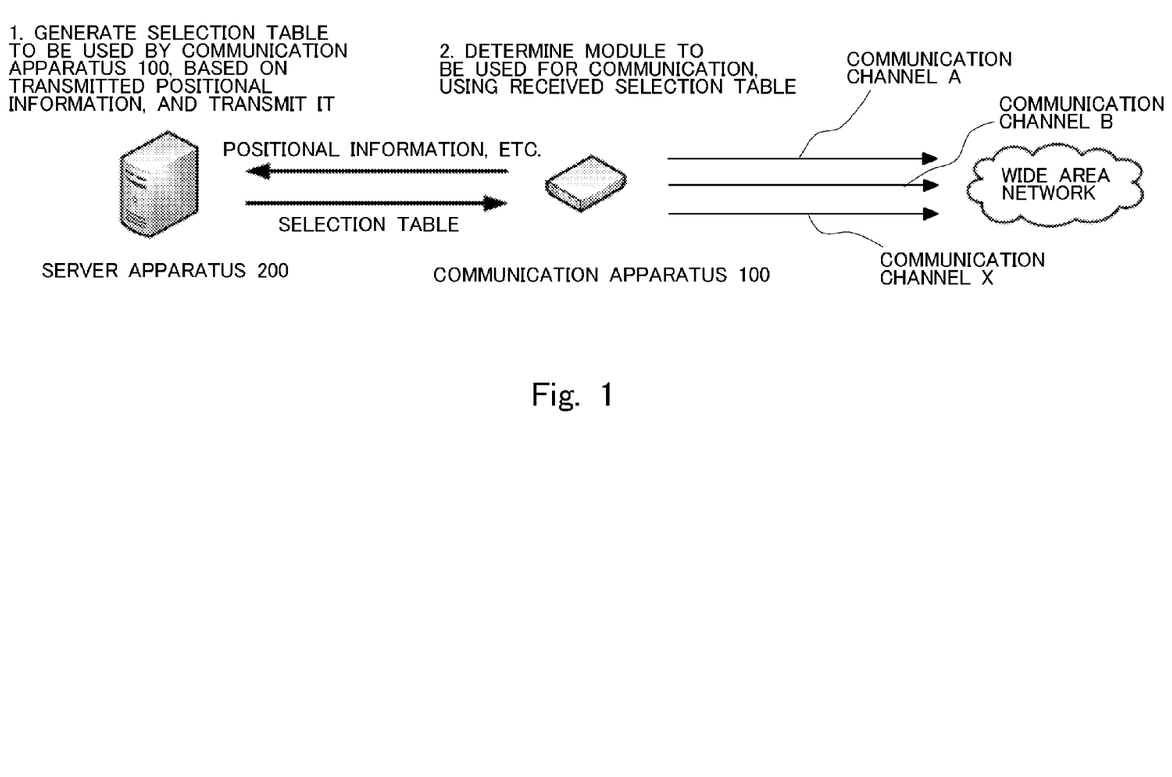
FIG. 1 is a schematic diagram of a system according to a first embodiment.
Figure 2:
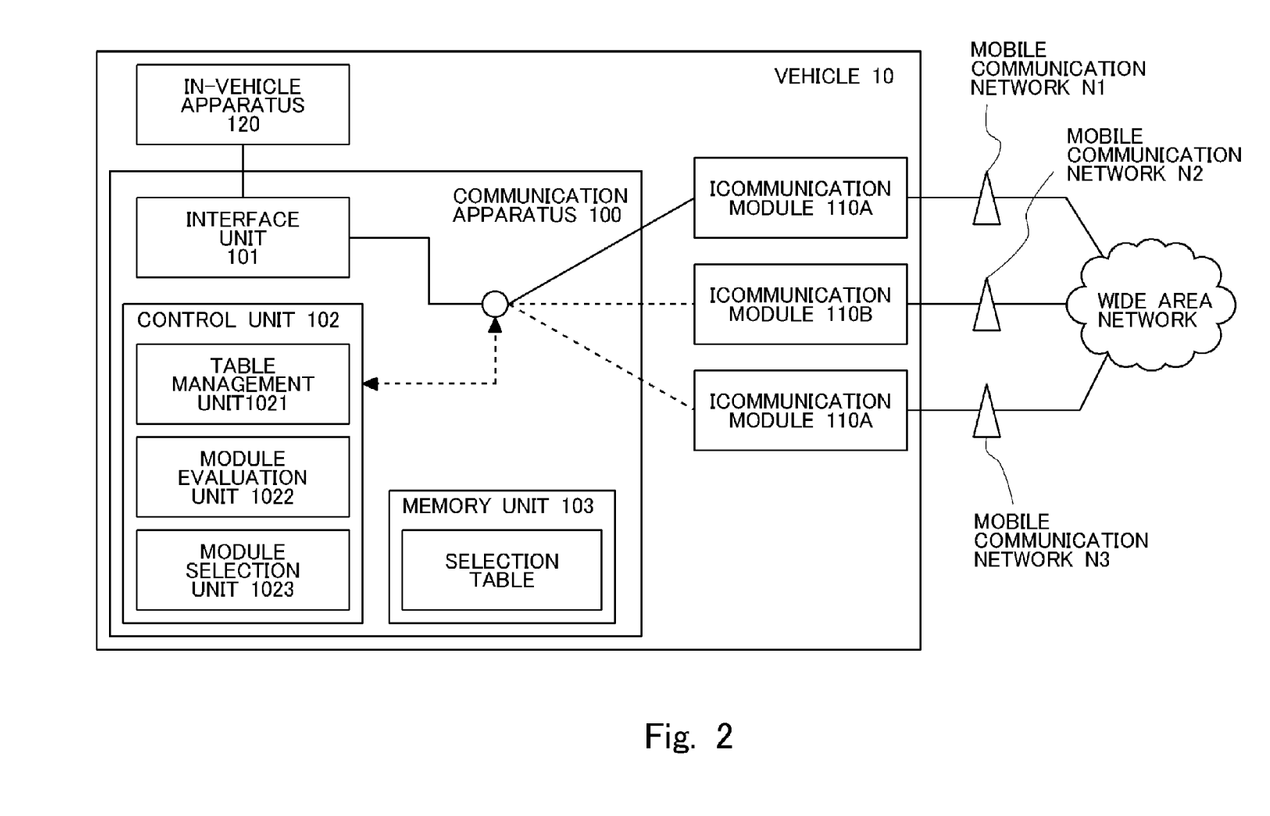
FIG. 2 is a block diagram schematically illustrating an example of a vehicle and a communication apparatus.

FIG. 2 is a block diagram schematically illustrating an example of a vehicle 10 provided with the communication apparatus 100 illustrated in FIG. 1. The vehicle 10 includes a communication apparatus 100, a plurality of communication modules 110A to 110C, and an in-vehicle apparatus 120.

Although three communication modules are illustrated in this example, there may be two or four or more communication modules.

The in-vehicle apparatus 120 is a computer installed in a vehicle. The in-vehicle apparatus 120 may be a navigation apparatus or an infotainment apparatus. The in-vehicle apparatus 120 communicates with the wide area network via the communication apparatus 100.

The communication apparatus 100 accesses to a wide area network using a plurality of communication modules described later.

The vehicle 10 has a plurality of communication modules (110A, 110B, and 110C). In this embodiment, the communication module 110A is a communication module (data communication module (DCM)) permanently installed in the vehicle. The communication modules 110B and 110C are communication modules that are not permanently installed in the vehicle. Examples of such a communication module include communication modules included in communication apparatuses (mobile routers and wired communication apparatuses) loaded into vehicles by users. The communication module 110A may be installed in the communication apparatus 100. In this embodiment, the communication modules are collectively referred to as the communication module 110.

Each communication module 110 provides access to a wide area network, using the corresponding mobile communication network. The communication modules 110 may use different communication standards.

In this example, the communication modules 110 use different mobile communication networks; however, the communication modules may use the same mobile communication network. For example, there may be a communication module that uses a service provided by a mobile network operator (MNO) and a communication module that uses a service provided by a mobile virtual network operator (MVNO). In addition, a plurality of communication modules may use the same mobile communication network under a plurality of contracts with different conditions.

The communication apparatus 100 includes an interface unit 101, a control unit 102, and a memory unit 103.

The interface unit 101 is an interface for transmitting and receiving data to/from the in-vehicle apparatus 120. The in-vehicle apparatus 120 and the communication apparatus 100 may be wired or wirelessly connected.

The control unit 102 is means for controlling the communication apparatus 100. The control unit 102 is a CPU, for example.

The control unit 102 includes functional modules which are a table management unit 1021, a module evaluation unit 1022, and a module selection unit 1023. Each functional module may be implemented when a CPU executes a program stored in memory means such as a ROM.

The table management unit 1021 manages a selection table acquired from the server apparatus 200 described later. To be specific, it communicates with the server apparatus 200 and executes a process of receiving a selection table from the server apparatus 200 and a process of updating the held selection table by using the received selection table. The details of the selection table will be described later.

The module evaluation unit 1022 executes a process of evaluating a plurality of communication modules. Each communication module can be evaluated, for example, in terms of the following items.

(1) Whether an electric field strength higher than or equal to a predetermined value can be obtained for the radio signal used by the mobile communication network For instance, a threshold is set for the electric field strength of the radio signal, and whether a value exceeding the threshold can be obtained is determined.

(2) Whether communication is substantially executable

For instance, round trip time and communication stability are measured to determine whether stable communication can be performed.

(3) Communication Cost

For instance, the communication cost for a given amount of data is acquired. The information about the communication cost may be prestored in the memory unit 103.

(4) Acquired Communication Speed

For instance, a communication test is performed using test data to measure the throughput (maximum value or average value).

The evaluation result for communication modules is transmitted to the module selection unit 1023 described later.

The module selection unit 1023 selects the communication module 110 to be used for communication based on the evaluation result for the communication modules and the selection table acquired from the server apparatus 200.

The memory unit 103 is means for storing information, and is a storage medium such as a RAM, a magnetic disk, or a flash memory. The memory unit 103 stores selection tables acquired from the server apparatus 200, various programs to be executed in the control unit 102, data to be used by the programs, and the like.

A selection table will now be described. In this embodiment, when the communication apparatus 100 transmits positional information to the server apparatus 200, the server apparatus 200 generates a selection table according to the positional information and transmits it to the communication apparatus 100.

Figure 3:
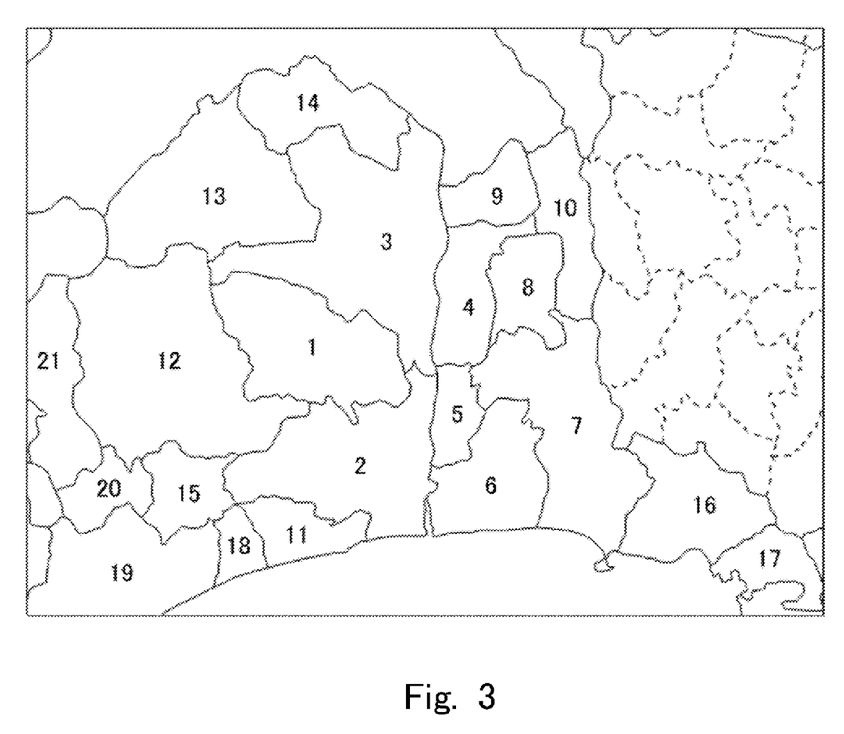
FIG. 3 is a diagram for explaining a region where vehicles are movable.

FIG. 3 is a diagram illustrating a region where a vehicle 10 is movable. In this example, the region where the vehicle 10 is movable is divided into a plurality of regions. Each divided region will be hereinafter referred to as a "region". In this example, 21 regions are illustrated. The size and shape of each region can be set arbitrarily. For example, a region may be set for each of the areas that have different communication conditions.

When the vehicle 10 moves between regions, the communication module selection criteria change.

For instance, a high-speed but highly localized mobile communication network is available in one region, and a low-speed but stable mobile communication network is available in another region.

In this embodiment, the server apparatus 200 specifies a region in which the vehicle 10 is running, based on the positional information transmitted from the communication apparatus 100, generates a selection table associated with the region, and transmits it to the communication apparatus 100.

Figure 4A:
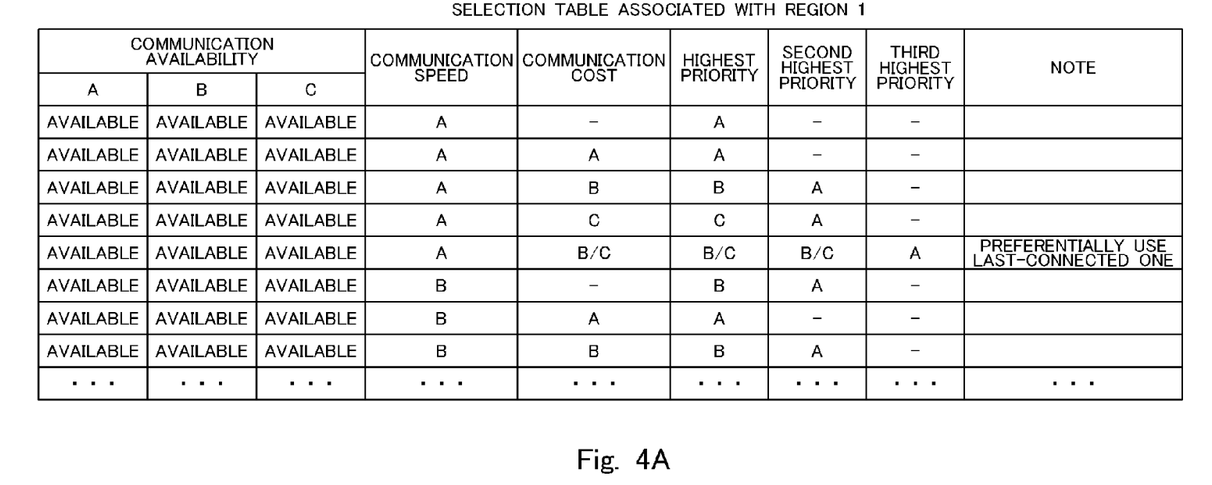
FIG. 4A illustrates an example of a selection table.
Figure 4B:
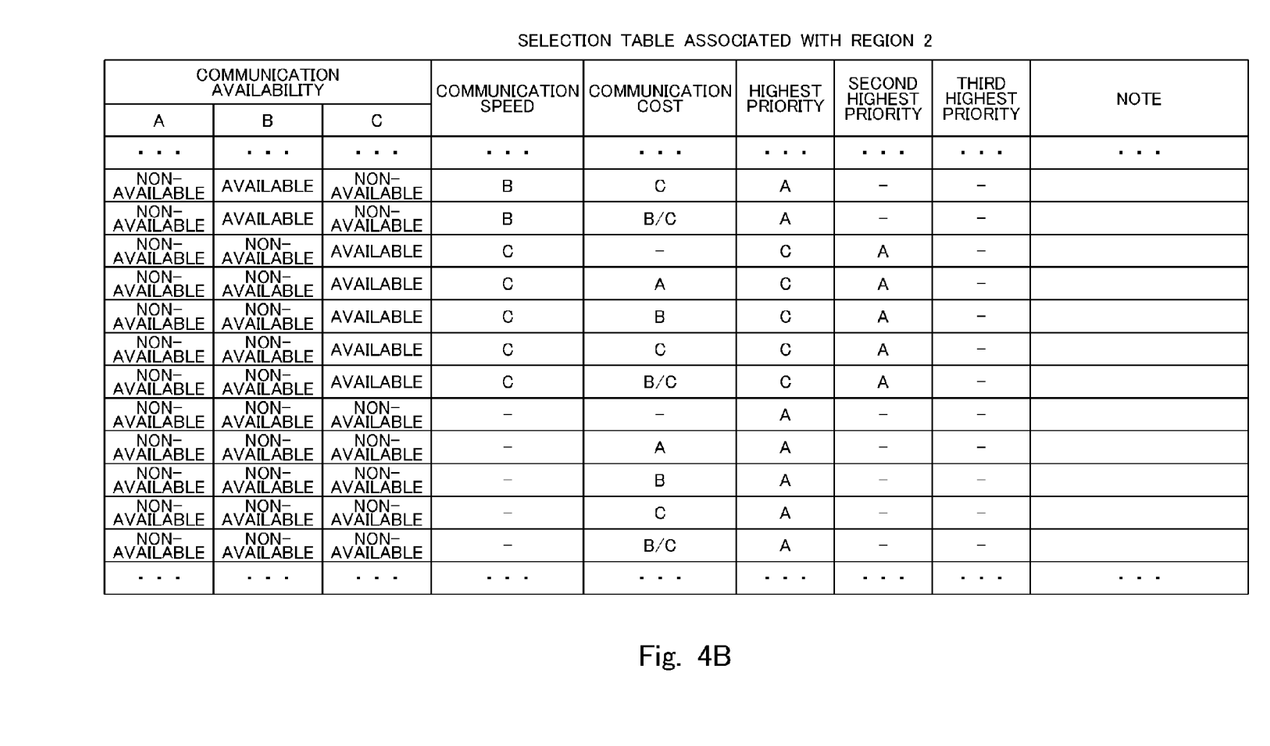
FIG. 4B illustrates an example of a selection table.

FIG. 4 is an example of a selection table. A to C in the drawing indicate the communication modules 110A to 110C, respectively. The "communication speed" column represents the communication module with the highest communication speed. The "communication cost" column represents the communication module that can communicate at the lowest cost (for example, communication charge per data amount).

The selection table illustrates what priority is used to select a plurality of communication modules when three evaluation criteria (communication availability, communication speed, and communication cost) are given. For instance, when all the communication modules are "communication is available", the communication module with the highest communication speed is A, and the communication module with the lowest communication cost is C (reference numeral 401), the communication module 110C is preferentially selected. Further, the communication module 110A is selected on the second highest priority.

If a communication module that is "not available" for communication is selected, data is transmitted and received after waiting until communication becomes available.

The selection table illustrated in FIG. 4A and the selection table illustrated in FIG. 4B correspond to different regions. Hence, for example, "in the region #1 where the in-vehicle communication module can deliver performance, the communication module 110A is preferentially selected", and "in the region #2 where the in-vehicle communication module has low reliability, the communication module 110C is preferentially used (note that the communication module 110B is not available).

Figure 5:
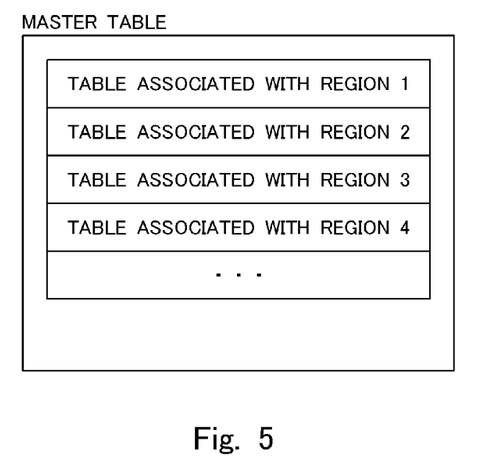
FIG. 5 is a diagram illustrating an example of a master table in the first embodiment.

The server apparatus 200, which stores a master table recording selection criteria for all regions, extracts the data associated with the designated region from the stored master table and generates a selection table to be transmitted to the communication apparatus 100. FIG. 5 is an example of the master table in the first embodiment.

The server apparatus 200 will now be described.

The server apparatus 200 can be a general-purpose computer. In other words, the server apparatus 200 can be a computer including a processor such as a CPU or GPU, a main memory such as a RAM or ROM, and an auxiliary memory such as an EPROM, a hard disk drive, or a removable medium. Note that the removable medium may be, for example, a USB memory or a disk recording medium such as a CD or DVD. An operating system (OS), various programs, various tables, and the like are stored in the auxiliary memory, and executing the programs stored therein implements the respective functions, which will be described later, meeting a predetermined purpose. Note that some or all of the functions may be implemented using a hardware circuit such as an ASIC or FPGA.

Figure 6:
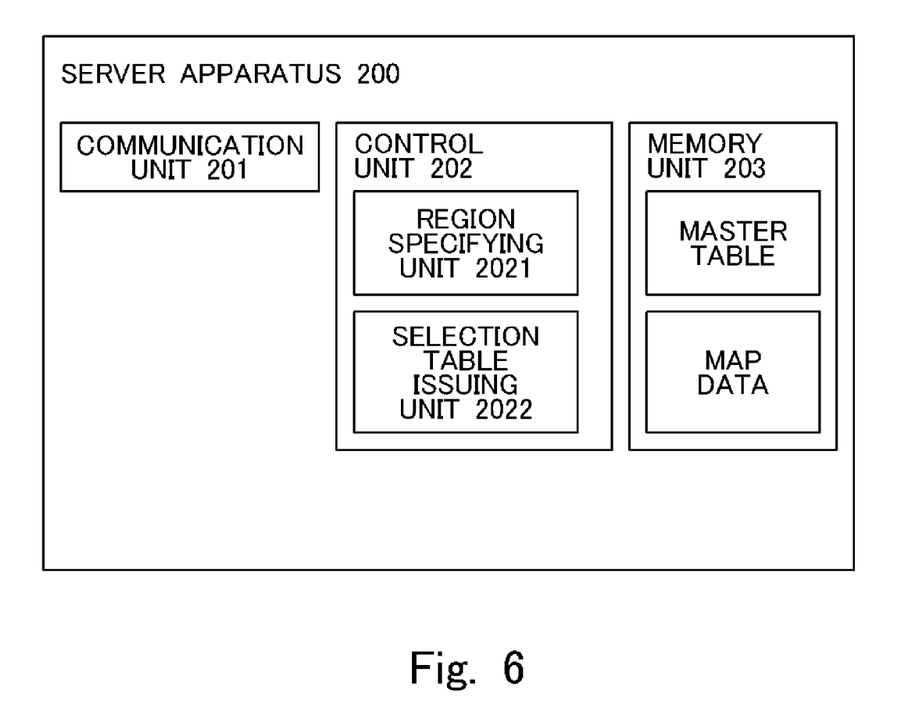
FIG. 6 is a block diagram schematically illustrating an example of a server apparatus.

FIG. 6 is a block diagram schematically illustrating an example of the server apparatus 200. The server apparatus 200 includes a communication unit 201, a control unit 202, and a memory unit 203.

The communication unit 201 is an interface for communication with the communication apparatus 100 via a network.

The control unit 202 is means for controlling the server apparatus 200. The control unit 202 is a CPU, for example.

The control unit 202 includes a region specifying unit 2021 and a selection table issuing unit 2022 as functional modules. Each functional module may be implemented when a CPU executes a program stored in memory means such as a ROM.

The region specifying unit 2021 identifies the region where the vehicle 10 is located, based on the information acquired from the communication apparatus 100. The region can be specified, for example, by comparing the map data (see FIG. 3, for example) defining the plurality of regions with the positional information transmitted from the communication apparatus 100.

The selection table issuing unit 2022 generates a selection table to be transmitted to the communication apparatus 100 in accordance with the designated region, and transmits it to the communication apparatus 100. To be specific, the data associated with the designated region is extracted from the stored master table and used as the selection table. The generated selection table is transmitted to the communication apparatus 100.

The memory unit 203 is means for storing information, and is a storage medium such as a RAM, a magnetic disk, or a flash memory. The memory unit 203 stores the aforementioned master table, map data, various programs to be executed by the control unit 202, data to be used by the programs, and the like.

Figure 7:
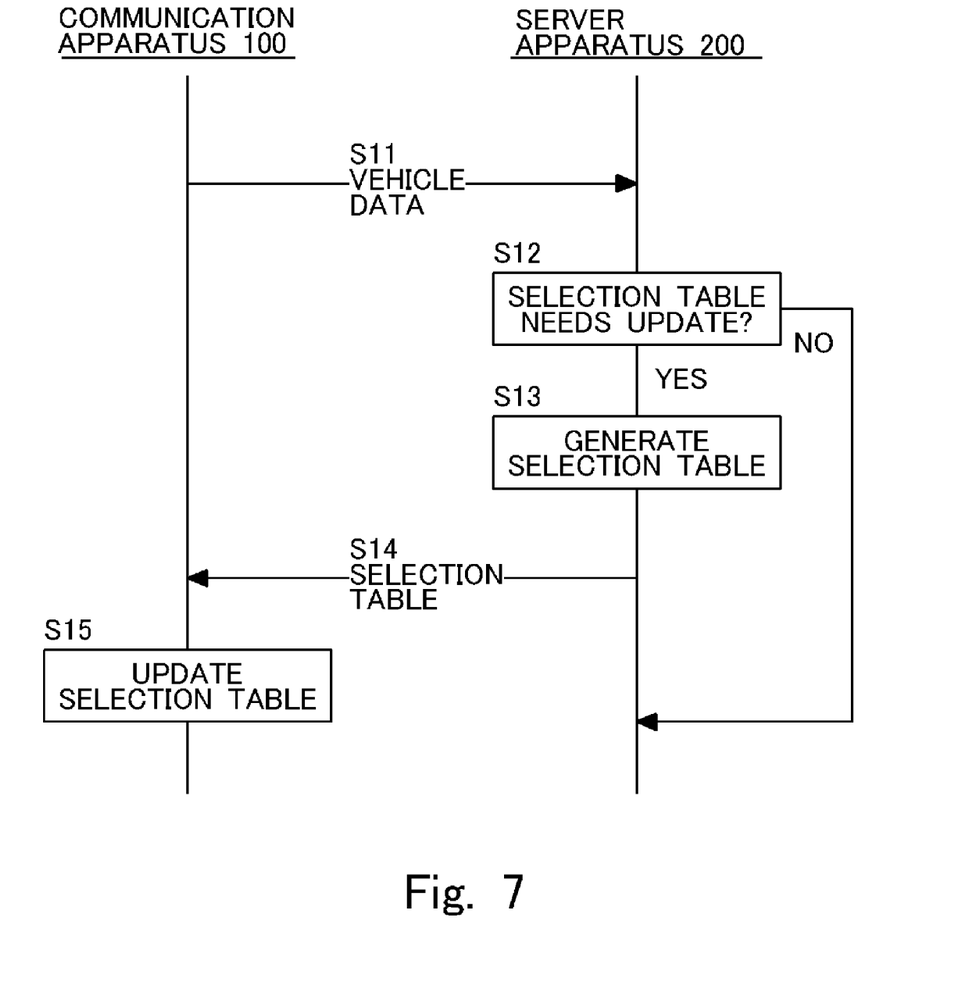
FIG. 7 is a flow diagram of data sent and received by the components of the system.
Figure 8:
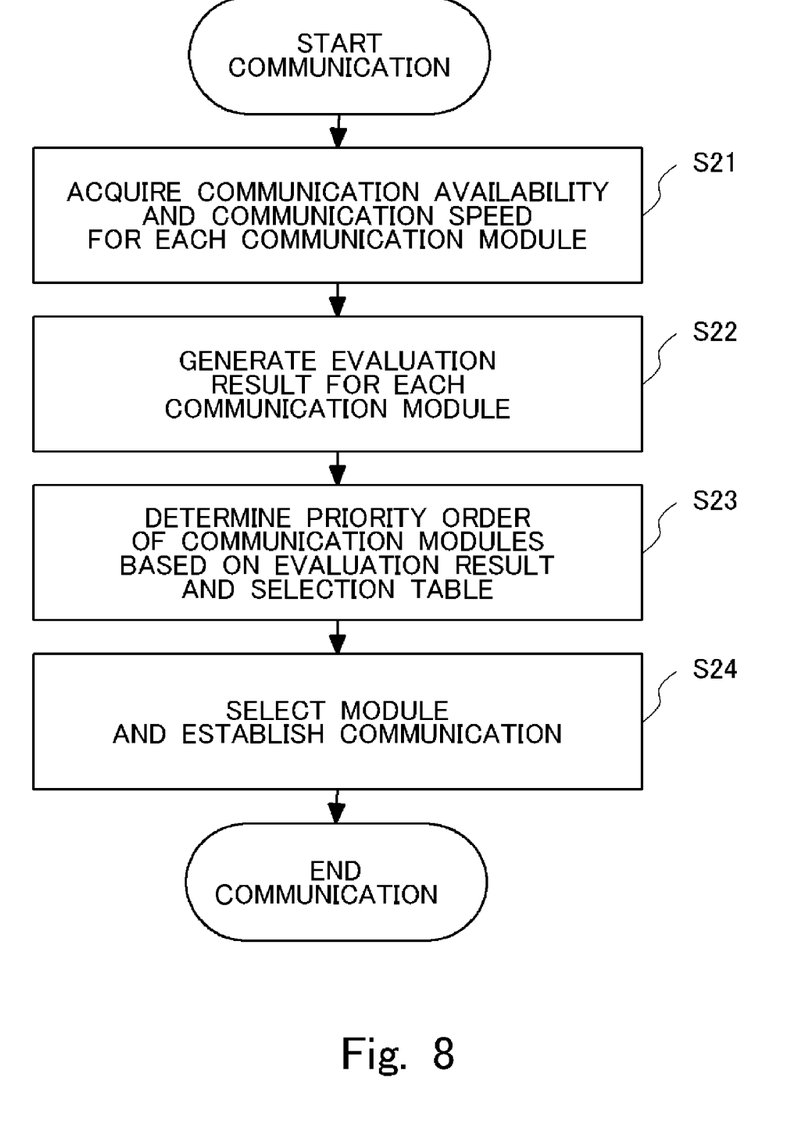
FIG. 8 is a flowchart of a process executed by the communication apparatus.

The process performed in the aforementioned components will now be explained. The process can be divided into a phase in which the communication apparatus 100 periodically communicates with the server apparatus 200 and acquires a selection table (first phase), and a phase in which the communication apparatus 100 determines a communication module to be used, based on the acquired selection table and performs communication (second phase). FIG. 7 is a data flowchart in the first phase, and FIG. 8 is a flowchart in the second phase.

The first phase will be explained with reference to FIG. 7. The first phase is periodically executed by the communication apparatus 100.

First, in Step S11, the communication apparatus 100 (table management unit 1021) transmits vehicle data to the server apparatus 200 (region specifying unit 2021). The vehicle data is data on the vehicle 10 and includes the positional information acquired by the communication apparatus 100.

Note that the communication module used in this step is not limited to a specific one. In other words, any one of the available mobile communication networks may be used as long as the communication can be accurately established.

In Step S12, the server apparatus 200 (region specifying unit 2021) determines whether or not to transmit the selection table according to the vehicle data (positional information) acquired from the communication apparatus 100. For instance, in the following cases, it is determined that the selection table should be transmitted to the communication apparatus 100.

(1) When the communication apparatus 100 does not have a selection table associated with the region where the vehicle 10 is located
(2) When a predetermined time has passed since the last transmission of the selection table associated with the region to the communication apparatus 100
(3) When the master table has been updated since the last transmission of the selection table associated with the region to the communication apparatus 100

If a positive determination is made in Step S12, the selection table issuing unit 2022 extracts data associated with the designated region from the master table and generates a selection table to be transmitted to the communication apparatus 100 in Step S13. The generated selection table is transmitted to the communication apparatus 100 in Step S14. The table management unit 1021 stores the table in the memory unit 103 (Step S15).

If a negative determination is made in Step S12, the process ends.

The second phase will be described with reference to FIG. 8. The illustrated process is executed by the communication apparatus 100 when the in-vehicle apparatus 120 needs to communicate.

First, in Step S21, the module evaluation unit 1022 evaluates communication availability and communication speed for each of the communication modules 110A to 110C. Whether communication is available may be determined based on the strength of the radio signal used by the mobile communication network. In other words, it may be determined that "communication is available" when the electric field strength that can be evaluated to allow communication with sufficient quality has been obtained.

Depending on the communication module used, the electric field strength in the mobile communication network may not be directly acquired. For instance, when a certain communication module is built in a mobile router, even if the signal strength of the wireless LAN is acquired, the signal strength of the mobile communication network side may not be acquired. In such a case, availability of communication may be determined according to whether communication has been actually established. For instance, it may be determined that "communication is available" when a Ping or HTTP request is transmitted and a response is received within a predetermined time. Whether communication is available may be determined according to the latency (round trip time) or may be determined according to the throughput. For instance, even if a certain level of throughput is obtained, it may be determined that communication is substantially not available if the round trip time is too long.

In Step S22, the module evaluation unit 1022 generates an evaluation result for each communication module. The evaluation result includes, for example, "communication availability", "communication speed", and "communication cost". The communication speed may be a maximum value or an average value. The communication cost may be a charge per amount of data. The evaluation result is transmitted to the module selection unit 1023.

In Step S23, the module selection unit 1023 determines the priority order of the communication modules (here, from the first to third) according to the evaluation result and the selection table stored in the memory unit 103.

In Step S24, communication is executed using the selected module.

According to the first embodiment, the communication module selection criteria can be changed according to the country or area where the vehicle is running. Hence, the optimal communication module suitable for the communication circumstance can be selected. In other words, a uniform communication environment can be provided in which differences in communication standards and communication qualities for each country or area are eliminated.

In the first embodiment, the communication modules are evaluated in Step S21; however, the communication modules need not be evaluated every time. For instance, the process of Step S21 may be executed only when a predetermined time has elapsed since the previous evaluation or when the vehicle 10 has moved a predetermined distance from the point where the previous evaluation was performed.

Aside from that, other information may also be used for selecting a communication module. For instance, a communication module to be finally used may be determined adding the preference of the user to the order of priority determined based on the selection table. Hence, it is possible to meet, for example, demands such as "I do not want to use the mobile device as much as possible because the data communication is a pay-as-you-go system" and "I want to use the mobile device preferentially because the data communication is unlimited".

Second Embodiment

In the first embodiment, the server apparatus 200 provides the same selection table for all vehicles located in a certain region. In contrast, in the second embodiment, a selection table is generated in consideration of other information in addition to the region.

In the second embodiment, when the communication apparatus 100 executes the process of Step S11, besides the positional information, information for identifying the vehicle type and other types of the vehicle 10 (hereinafter referred to as vehicle type) is contained in the vehicle data.

Figure 9:
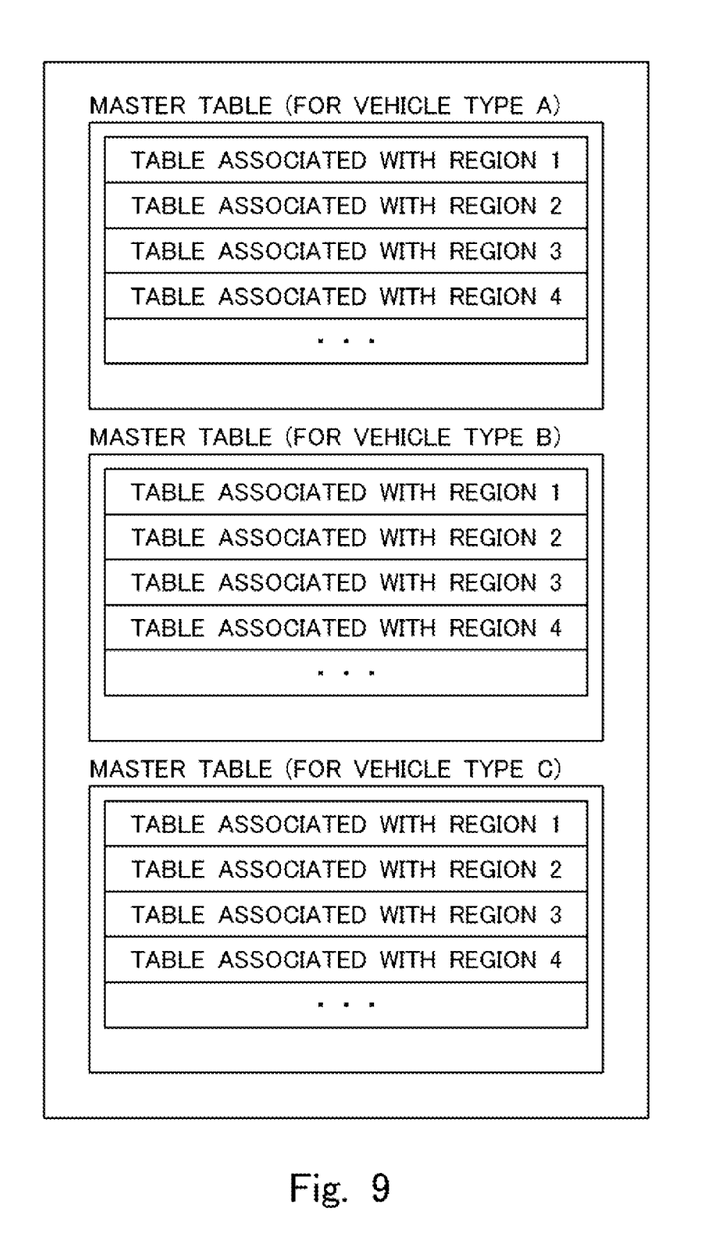
FIG. 9 is a diagram illustrating an example of the master table in the second embodiment.

In the second embodiment, the server apparatus 200 holds a master table for each vehicle type. FIG. 9 is an example of a master table in the second embodiment. Upon reception of the vehicle data, the server apparatus 200 determines the vehicle type of the vehicle 10, determines the selection table to be transmitted to the communication apparatus 100, using a combination of the positional information and the vehicle type, and executes the processes of Steps S12 and S13.

The reason why the selection table is made different for each vehicle type will now be explained.

For instance, when a communication module performs millimeter wave communication, the obtained gain may change depending on the antenna directivity and installation position. In other words, even with the same communication module, not all types of vehicles can communicate under the same conditions in some cases. In contrast, a selection table is generated in consideration of the vehicle type in the second embodiment, so that an appropriate communication module can be selected for each vehicle.

Although a selection table is generated in consideration of the vehicle type in the second embodiment, other information may be used instead of the vehicle type. For instance, data indicating the specific vehicle type of the vehicle 10 or the installation position of the antenna may be contained in the vehicle data, and the selection table may be generated according to the data. Aside from that, data indicating the type of communication contract that the user riding the vehicle 10 has may be contained in the vehicle data, and the selection table may be generated according to the type of communication contract.

Alternatively, the selection table may be generated without positional information. For instance, in case of communication failure in a certain mobile communication network or when a wave stop due to maintenance is scheduled, the selection table may be generated based on the time information. This makes it possible to take measures such as stopping the use of a specific communication module during a predetermined period. It is also possible to target only a specific region by also using the positional information.

A random numerical value generated by the communication apparatus 100 may be contained in the vehicle data and the selection table may be generated based on the random numerical value. When communication congestion is expected in a specific area, the traffic can be distributed to a plurality of communication channels by generating a selection table based on a random value.

Modification

The aforementioned embodiment is merely illustrative and appropriate modification can be made without departing from the scope of the present disclosure.

For instance, the processing and means described in this disclosure can be freely combined unless inconsistencies arise.

In the description of the embodiment, the communication apparatus 100 periodically transmits vehicle data to the server apparatus 200, and the server apparatus 200 starts to generate a selection table in response to the vehicle data; however, these processes are not necessarily be triggered by the communication apparatus 100. For instance, the server apparatus 200 may poll the communication apparatus 100. In this case, the communication apparatus 100 may transmit vehicle data in response to the call from the server apparatus 200.

Additionally, vehicle data is not necessarily be transmitted periodically. For example, vehicle data may be transmitted every time the vehicle 10 runs a predetermined distance. When entrance to a different region can be confirmed by the vehicle, the process in FIG. 7 may be started using this as a trigger.

The description of the embodiment was made assuming that the communication modules (A to C) listed in the selection table are associated with the communication modules (110A to 110C) included in the vehicle 10, respectively; however, the communication apparatus 100 may associate the communication modules (for example, in Step S15). In addition, the vehicle data may include data for identifying the type of the communication module included in the vehicle 10, and the server apparatus 200 may associate them according to the data. In any case, when a communication module that the vehicle 10 does not have is included in the master table (selection table), those definitions may be deleted.

The process that is performed in one device according to the above description may be shared by a plurality of devices. In contrast, the process that is performed in different devices according to the above description may be performed in one device. In the computer system, the hardware configuration (server configuration) for implementing each function can be flexibly changed.

The present disclosure can be implemented when a computer program having the functions that have been described in the above embodiment is supplied to a computer, and one or more processors in the computer read and execute the program. Such a computer program may be provided to the computer via a non-transitory computer-readable memory medium that can be connected to the computer's system bus or via a network. Examples of non-transitory computer-readable memory medium include any type of disks such as magnetic disks (such as floppy (registered trademark) disks and hard disk drives (HDDs)), and optical disks (such as CD-ROMs, DVD disks, and Blu-ray disks), read only memories (ROMs), random access memories (RAMs), EPROMs, EEPROMs, magnetic cards, flash memories, optical cards, and any type of media suitable for storing electronic instructions.

What is claimed is:

1. A communication apparatus that is configured to communicate with a public communication network by using at least one of a plurality of communication modules including an in-vehicle communication module permanently installed in a vehicle and one or more external communication modules not installed permanently in the vehicle, the communication apparatus comprising:
a memory configured to store a selection table recording a criterion for selecting a communication module of the plurality of communication modules to be used for the communication with the public communication network; and
a processor configured to:
transmit vehicle data about the vehicle to a server configured to communicate with the communication apparatus over the public communication network, the vehicle data including a position of the vehicle and a vehicle type of the vehicle;
receive one selection table of a plurality of selection tables from the server, and update the stored selection table based on the received selection table, each of the plurality of selection tables being generated by the server according to a different vehicle type, the received selection table being selected and modified based on the vehicle data of the vehicle;
select and evaluate a plural sub-set of the plurality of communication modules and acquire an evaluation result, the sub-set of the plurality of communication modules including the in-vehicle communication module and at least one external communication module; and
select one communication module of the evaluated sub-set of the plurality of communication modules to be used for communication according to the evaluation result and the received selection table.

2. The communication apparatus according to claim 1, wherein the processor performs the evaluating of the sub-set of the plurality of communication modules by using a plurality of criteria.

3. The communication apparatus according to claim 2, wherein the plurality of criteria include at least one of communication cost, communication speed, and communication availability.

4. The communication apparatus according to claim 1, wherein the selection table is a table in which the evaluation result for each communication module of the plurality of communication modules is associated with a communication module selection priority.

5. The communication apparatus according to claim 1, wherein when the communication apparatus moves between a plurality of regions, the processor receives the selection table associated with a destination region from the server apparatus.

6. A communication system comprising:
a communication apparatus that is configured to communicate with a public communication network by using at least one of a plurality of communication modules including an in-vehicle communication module permanently installed in a vehicle and one or more external communication modules not installed permanently in the vehicle; and
a server apparatus that provides the communication apparatus with information, the server apparatus including:
a first memory configured to store a plurality of selection tables recording a criterion for selecting a communication module of the plurality of communication modules to be used by the communication apparatus for communication with the public communication network; and
a first processor configured to generate the plurality of selection tables according to a different vehicle type, and distribute one selection table of the plurality of selection tables to the communication apparatus, in response to receiving vehicle data about the vehicle, and
wherein the communication apparatus includes:
a second memory configured to store the selection table received from the server apparatus; and
a second processor configured to (i) transmit the vehicle data about the vehicle to the server apparatus, the vehicle data including a position of the vehicle and the vehicle type of the vehicle, (ii) receive the distributed one selection table from the server, and update the stored selection table based on the received selection table, the received selection table being selected and modified based on the vehicle data of the vehicle, (iii) select and evaluate a plural sub-set of the plurality of communication modules and acquire an evaluation result, the sub-set of the plurality of communication modules including the in-vehicle communication module and at least one external communication module, and (iv) select one communication module of the evaluated sub-set of the plurality of communication modules to be used for communication according to the evaluation result and the received selection table.

7. The communication system according to claim 6, wherein the second processor performs the evaluation of the sub-set of the plurality of the communication modules by using a plurality of criteria.

8. The communication system according to claim 7, wherein the plurality of criteria include at least one of communication cost, communication speed, and communication availability.

9. The communication system according to claim 6, wherein the selection table is a table in which the evaluation result for each communication module of the plurality of communication modules is associated with a communication module selection priority.

10. The communication system according to claim 6, wherein when the communication apparatus moves between a plurality of regions, the first processor distributes the selection table associated with a destination region.

11. A communication method performed by a communication apparatus that is configured to communicate with a public communication network by using at least one of a plurality of communication modules including an in-vehicle communication module permanently installed in a vehicle and one or more external communication modules not installed permanently in the vehicle, the communication method comprising steps of:
transmitting vehicle data about the vehicle to a server configured to communicate with the communication apparatus over the public communication network, the vehicle data including a position of the vehicle and a vehicle type of the vehicle;
acquiring one selection table of a plurality of selection tables from the server recording a criterion for selecting a communication module of the plurality of communication modules to be used for the communication with the public communication network, each of the plurality of selection tables being generated by the server according to a different vehicle type, the acquired selection table being selected and modified based on the vehicle data of the vehicle;
updating a previously stored selection table based on the acquired selection table;
selecting and evaluating a plural sub-set of the plurality of communication modules and acquiring an evaluation result, the sub-set of the plurality of communication modules including the in-vehicle communication module and at least one external communication module; and
selecting one communication module of the evaluated sub-set of the plurality of communication modules to be used for communication according to the evaluation result and the acquired selection table.

12. The communication method according to claim 11, wherein the evaluation of the sub-set of the plurality of the communication modules is performed using a plurality of criteria.

13. The communication method according to claim 12, wherein the plurality of criteria include at least one of communication cost, communication speed, and communication availability.

14. The communication method according to claim 11, wherein the selection table is a table in which the evaluation result for each communication module of the plurality of communication modules is associated with a communication module selection priority.

15. The communication method according to claim 11, wherein when the communication apparatus moves between a plurality of regions, the selection table associated with a destination region is received from the server apparatus.

* * * * *